US012597830B2

(12) United States Patent
Bauman

(10) Patent No.: US 12,597,830 B2
(45) Date of Patent: Apr. 7, 2026

(54) E-MACHINE WITH A COOLING SYSTEM INCLUDING SPRAYER ARRANGEMENT

(71) Applicant: Garrett Transportation I Inc., Torrance, CA (US)

(72) Inventor: Kyle Bauman, Costa Mesa, CA (US)

(73) Assignee: Garrett Transportation I Inc., Torrance, CA (US)

( * ) Notice: Subject to any disclaimer, the term of this patent is extended or adjusted under 35 U.S.C. 154(b) by 343 days.

(21) Appl. No.: 18/326,277

(22) Filed: May 31, 2023

(65) Prior Publication Data

US 2023/0421024 A1 Dec. 28, 2023

Related U.S. Application Data

(60) Provisional application No. 63/367,053, filed on Jun. 27, 2022.

(51) Int. Cl.
| | |
|---|---|
| *H02K 9/19* | (2006.01) |
| *B05B 1/04* | (2006.01) |
| *H02K 15/02* | (2025.01) |

(52) U.S. Cl.
CPC ................ *H02K 9/19* (2013.01); *B05B 1/04* (2013.01); *H02K 15/02* (2013.01)

(58) Field of Classification Search
USPC ........................................................ 310/54
See application file for complete search history.

(56) References Cited

U.S. PATENT DOCUMENTS

| | | | |
|---|---|---|---|
| 5,682,074 A | 10/1997 | Di Pietro et al. | |
| 8,884,479 B2 | 11/2014 | Burnett et al. | |
| 9,419,499 B2 | 8/2016 | Matsui et al. | |
| 2021/0249935 A1* | 8/2021 | Long ...................... | B60K 11/02 |

FOREIGN PATENT DOCUMENTS

| | | | | |
|---|---|---|---|---|
| CN | 110798022 A | 2/2020 | | |
| JP | 2012044760 A | 3/2012 | | |
| WO | WO-2023232638 A1 * | 12/2023 | ............... | H02K 9/19 |

OTHER PUBLICATIONS

WO-2023232638-A1 machine translation (Year: 2023).*
Gundabattini et al.; "Thermal Mapping of a High-Speed Electric Motor Used for Traction Applications and Analysis of Various Cooling Methods—A Review"; Energies; Mar. 2021; pp. 1-33.

* cited by examiner

*Primary Examiner* — Oluseye Iwarere
*Assistant Examiner* — Minki Chang
(74) *Attorney, Agent, or Firm* — BelayIP

(57) ABSTRACT

An e-machine includes a housing and a rotating group supported for rotation about an axis of rotation within the housing. The e-machine includes a stator with a plurality of end windings. The e-machine further includes a plurality of nozzles that is removably supported by the housing and spaced apart in a circumferential direction about the axis of rotation. The plurality of nozzles is directed generally radially toward the axis of rotation and toward the plurality of end windings for spraying a cooling fluid on respective ones of the plurality of end windings.

20 Claims, 3 Drawing Sheets

E-MACHINE WITH A COOLING SYSTEM INCLUDING SPRAYER ARRANGEMENT

CROSS REFERENCE TO RELATED APPLICATION

The following claims priority to U.S. Provisional Patent Application Ser. No. 63/367,053, filed Jun. 27, 2022, the entire of disclosure of which is incorporated by reference.

TECHNICAL FIELD

The present disclosure generally relates to an e-machine and, more particularly, relates to an e-machine with a cooling system that includes a sprayer arrangement.

BACKGROUND

Various e-machines are provided for a number of purposes. For example, electric motors are provided for driving a shaft in rotation, electric generators are provided for converting shaft rotation into electric energy, and some e-machines are configured to operate in some conditions as a motor and in other conditions as a generator.

The e-machine may include a stator that generates significant heat during operation. Excessive thermal conditions may negatively affect the performance of the e-machine. For example, the thermal limits of the materials of the stator may limit the amount of power that may be produced by the e-machine.

Thus, in some cases, the e-machine may be configured with a cooling system. Various types of cooling systems are proposed for these purposes. However, conventional cooling systems of this type may have limited effectiveness, and performance may be limited as a result.

Accordingly, it is desirable to provide an improved cooling system for an e-machine. For example, it is desirable to provide an e-machine that effectively provides a cooling fluid to the stator. It is also desirable to provide such a cooling system wherein the cooling fluid circulates through the e-machine efficiently and effectively for improved operations. Moreover, it is desirable to provide such a e-machine, which may be manufactured and assembled in an efficient manner. Other desirable features and characteristics of the present disclosure will become apparent from the subsequent detailed description and the appended claims, taken in conjunction with the accompanying drawings and this background discussion.

SUMMARY

An e-machine is disclosed that includes a housing and a rotating group supported for rotation about an axis of rotation within the housing. The e-machine includes a stator with a plurality of end windings. The e-machine further includes a plurality of nozzles that is removably supported by the housing and spaced apart in a circumferential direction about the axis of rotation. The plurality of nozzles is directed generally radially toward the axis of rotation and toward the plurality of end windings for spraying a cooling fluid on respective ones of the plurality of end windings.

Also, an electric motor is disclosed that includes a housing and a rotating group supported for rotation about an axis of rotation within the housing. The electric motor further includes a stator disposed within the housing that is operably coupled to the rotating group. The stator includes a plurality of end windings, and the plurality of end windings collectively defines an imaginary end winding outer boundary that extends continuously about the axis of rotation. Moreover, the electric motor includes a plurality of nozzles removably supported by the housing and spaced apart in a circumferential direction about the axis of rotation in a nozzle arrangement. The plurality of nozzles in the nozzle arrangement is directed generally radially toward the axis of rotation, and the plurality of nozzles is configured for atomizing a cooling fluid and spraying the cooling fluid in a collective spray profile that covers at least part of the imaginary end winding outer boundary and onto respective ones of the plurality of end windings, the collective spray profile covering a majority of the imaginary end winding outer boundary in a circumferential direction about the axis of rotation.

Furthermore, a method of manufacturing an e-machine is disclosed. The method includes providing a housing and supporting a rotating group for rotation about an axis of rotation within the housing. The method further includes inserting a stator within the housing. The stator includes a plurality of end windings. Additionally, the method includes removably supporting a plurality of nozzles in the housing to be spaced apart in a circumferential direction about the axis of rotation. The plurality of nozzles is directed generally radially toward the axis of rotation and toward the plurality of end windings for spraying a cooling fluid on respective ones of the plurality of end windings.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Broadly, example embodiments disclosed herein include an improved e-machine, such as an electric motor or electric generator. The e-machine of the present disclosure may include a cooling system that provides a cooling fluid, such as coolant oil, to the stator of the e-machine. The cooling system may also include one or more (e.g., a plurality of) outlets for the coolant oil (e.g., nozzles, sprayers, etc.). The nozzle(s) may be disposed in a predetermined arrangement, for example, with respect to the axis of rotation of the e-machine. In some embodiments, the inlets may extend radially through the motor housing, and nozzles may be provided for directing spray radially toward the stator (e.g., toward the end windings of the stator).

In some embodiments, the outlets may be included on respective nozzles (i.e., nozzle members) that are removeably supported by the housing. The nozzles may be positioned and received within respective cavities of the e-machine housing. The nozzles may include a respective nozzle head with an outlet opening. The nozzle head may have one or more shaped surfaces or other features for providing a predetermined spray profile from the outlet opening. The spray profile may be fan-shaped in some embodiments for providing substantial coverage of the end windings of the stator.

Furthermore, in some embodiments, a nozzle arrangement may be included that is configured to direct the cooling fluid to span a majority of the stator in the circumferential direction. The spray collectively applied by a plurality of nozzles may apply the cooling fluid to an entire circumference of the stator end turns in some embodiments. Accordingly, "fresh" and "cool" cooling fluid may be directed at multiple angular positions around the circumference of the stator end windings to ensure that all or nearly all locations receive a cooling effect. As such, the cooling fluid may be effectively and efficiently delivered to the end turns of the stator. The features of the present disclosure may help reduce/eliminate misting evaporation, coking, and/or deposit formation, which may otherwise cause cooling degradation. The nozzles may provide an advantageous amount of atomization of the cooling fluid. There may be a high degree of atomization and a high degree of fluid flow through the e-machine, thereby providing highly effective cooling for the stator.

Furthermore, the e-machine may include the cooling features in a relatively compact package. The e-machine may be manufactured efficiently, and the part count may be relatively low for additional manufacturing advantages.

Figure 1:
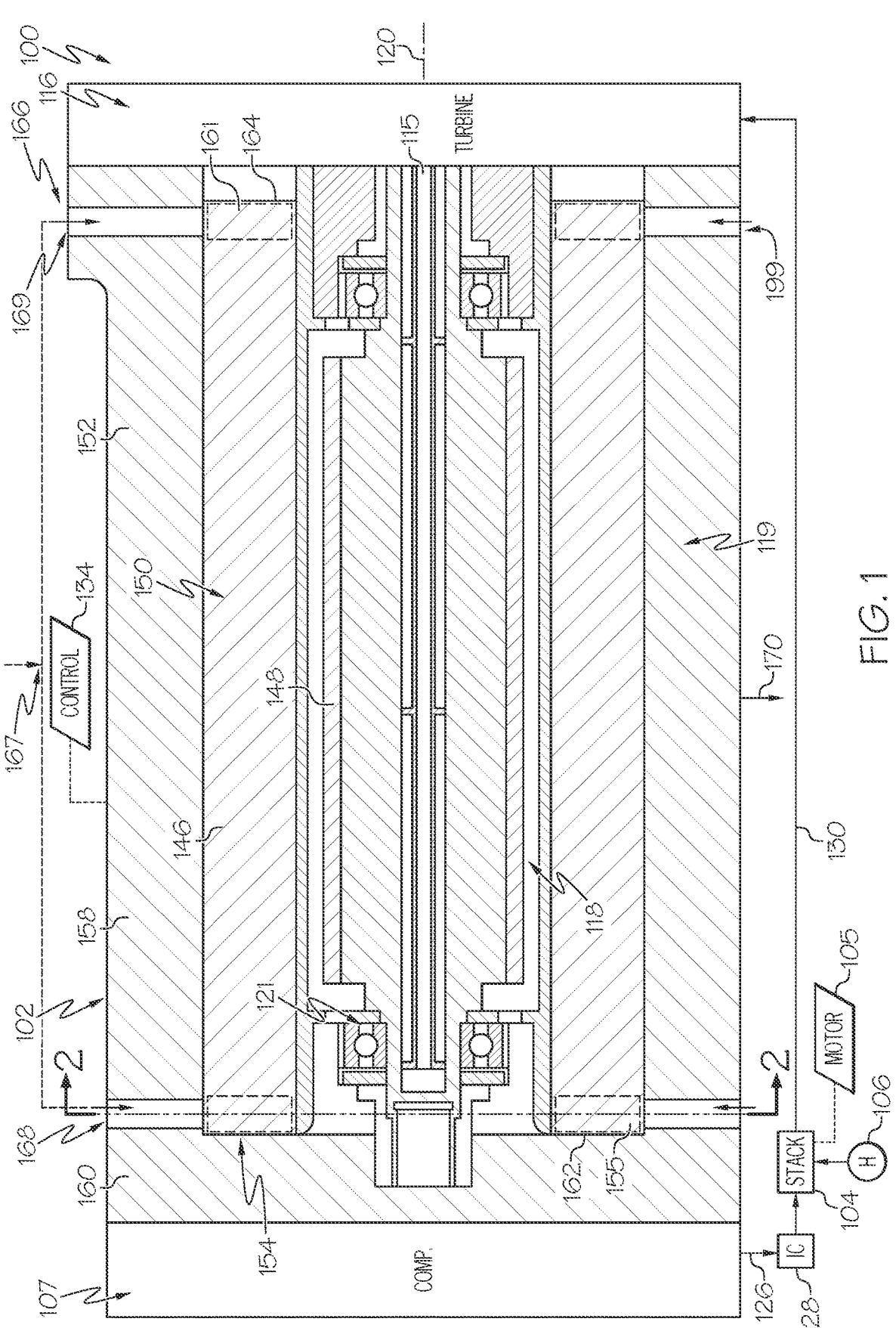
FIG. 1 is a schematic illustration of an engine system with a turbomachine having an e-machine configured according to example embodiments of the present disclosure.

FIG. 1 is a schematic view of a fuel cell system 100 with an example turbomachine 102 of the present disclosure. In some embodiments, the fuel cell system 100 may be included in a vehicle, such as a car, truck, sport utility vehicle, van, motorcycle, etc. However, it will be appreciated that the fuel cell system 100 may be configured for a different use without departing from the scope of the present disclosure.

The fuel cell system 100 may include a fuel cell stack 104 containing a plurality of fuel cells. Hydrogen may be supplied to the fuel cell stack 104 from a tank 106, and oxygen may be supplied to the fuel cell stack 104 to generate electricity by a known chemical reaction. The fuel cell stack 104 may generate electricity for an electrical device, such as an electric motor 105. As stated, the fuel cell system 100 may be included in a vehicle; therefore, in some embodiments, the electric motor 105 may convert the electrical power to mechanical power to drive and rotate an axle (and, thus, one or more wheels) of the vehicle.

Oxygen may be provided to the fuel cell stack 104, at least in part, by the turbomachine 102. As will be discussed, the turbomachine 102 may compress air as it flows toward the fuel cell stack 104 for boosting the operating efficiency of the fuel cell system 100.

For example, the turbomachine 102 may be configured as a turbocharger with a compressor stage 107 and a turbine stage 116 (both shown schematically). As shown in FIG. 1, the turbomachine 102 may generally include a rotating group 118 and a housing 119. The rotating group 118 may include a shaft 115 that is supported for rotation about an axis 120 within the housing 119 by a bearing system 121. The bearing system 121 may have a variety of configurations. For example, the bearing system 121 may include one or more rolling element bearings. In additional embodiments, the bearing system 121 may include a plain bearing, an air bearing, and/or an oil-less bearing. The compressor stage 107 may include a compressor wheel that is mounted on the shaft 115 and that is supported within a portion of the housing 119 (i.e., within a compressor housing). Likewise, the turbine stage 116 may include a turbine wheel that is mounted on the shaft 115 and that is supported within a portion of the housing 119 (i.e., within a turbine housing). The shaft 115 may operably couple the wheels of the compressor stage 107 and the turbine stage 116 such that they rotate as a unit (i.e., to collectively define the rotating group 118).

Furthermore, in some embodiments, the turbomachine 102 may be equipped with an e-machine, such as an electric motor 150. The electric motor 150 may be configured as a radial-type electric motor. In additional embodiments, the e-machine may be an electric generator or a combination motor/generator that operates as a motor in some conditions and alternatively as a generator in other conditions. The electric motor 150 may include a stator 146 and a rotor 148. The stator 146 may be supported within the housing 119, and the rotor 148 may be operably attached to the shaft 115 to define part of the rotating group 118. During operation, the motor 150 may drive the rotating group 118 in rotation about an axis 120.

Furthermore, during operation of the turbomachine 102, the compressor stage 107 may receive an inlet airstream, which the compressor stage 107 compresses into to a high pressure airstream 126 that is directed, for example, to an intercooler 128 and then to the fuel cell stack 104. Accordingly, the stack 104 may generate electricity from the hydrogen provided from the tank 106 and the oxygen provided by the high pressure airstream 126.

Moreover, an exhaust gas stream (represented by arrow 130) from the fuel cell stack 104 may be directed back to the turbine stage 116 of the turbomachine 102. The exhaust gas stream 130 may drive and rotate the rotating group 118 at the turbine stage 116 to assist the motor section 112.

Various components of the fuel cell system 100 may be controlled by a control system 134. The control system 134 may be a computerized system with a processor, various sensors, and other components for electrically controlling operation of the fuel cell stack 104, the motor 150, and/or other features of the system 100. In some embodiments, the control system 134 may define or may be part of the electrical control unit (ECU) of a vehicle.

It will be appreciated that the turbomachine 102 could have a different configuration from the turbocharger illustrated in FIG. 1 without departing from the scope of the present disclosure. For example, the turbomachine 102 may be configured as an electric motor assisted fluid compressor (i.e., a turbine-less fluid compressor) in some embodiments. Furthermore, the turbomachine 102 of the present disclosure may be incorporated into a number of systems other than a fuel cell system without departing from the scope of the present disclosure. For example, the turbomachine 102 of the present disclosure may be incorporated within an internal combustion engine system for compressing air that is fed to an internal combustion engine, or the turbomachine 102 may be incorporated within another system without departing from the scope of the present disclosure. Furthermore, the electric motor 150 may be incorporated in or otherwise operably connected to another machine other than a turbomachine without departing from the scope of the present disclosure. In some embodiments, for example, the electric motor 150 of the present disclosure may be configured for an electric vehicle traction drive system. As such, the shaft 115 of the electric motor 150 may be an output shaft that provides power to a transmission for driving an axle in rotation.

Figure 2:
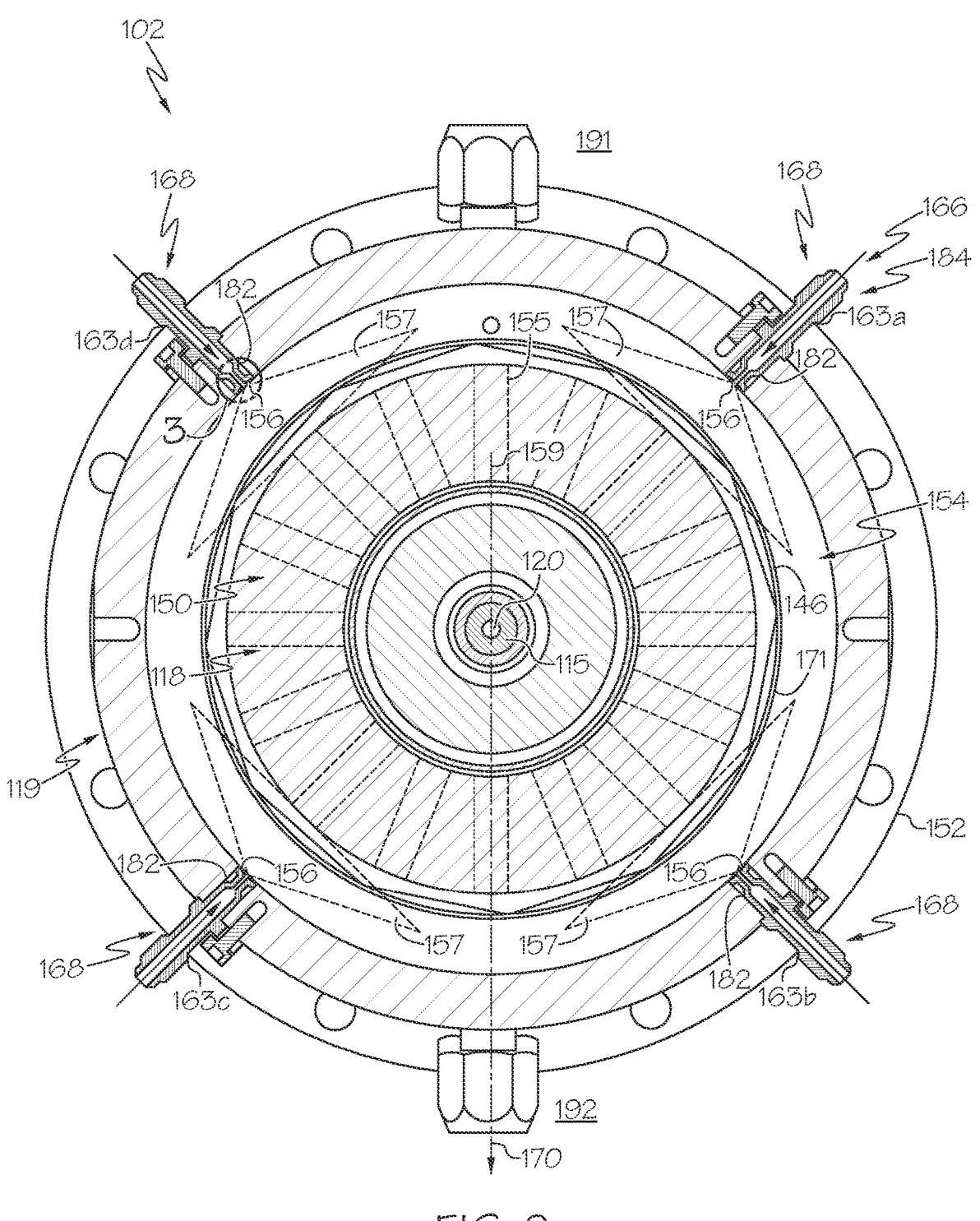
FIG. 2 is a schematic longitudinal cross-section of the e-machine taken along the line 2-2 of FIG. 1 according to example embodiments of the present disclosure.

Referring now to FIGS. 1-2, additional features of the electric motor 150 will be discussed. As shown, the housing 119 may include a motor housing 152. The motor housing 152 may be a hollow member defined by two or more parts that are attached together to collectively define a motor cavity 154 therein. The cavity 154 may be cylindrical and substantially centered on the axis of rotation 120. The cavity 154 may be defined by at least one outer radial wall member 158 and an axial end wall 160. The outer radial wall member 158 may cover over outer radial surface(s) of the motor 150, and the axial end wall 160 may cover over a first axial end 162 of the motor 150. In some embodiments, the compressor stage 107 and the motor 150 may be disposed on opposite axial sides of the axial end wall 160. Although not specifically shown, the motor cavity 154 may be further defined by an axial end wall that is disposed on a second axial end 164 of the motor 150 and that separates the motor 150 from the turbine stage 116.

The shaft 115 may extend through the motor cavity 154. The rotor 148 may be mounted on the shaft 115 within the motor cavity 154. The stator 146 may be supported within the motor cavity 154 and may surround the rotor 148.

The electric motor 150 may further include at least one cooling system 166. The cooling system 166 may be configured for removing heat from the motor 150. The cooling system 166 may include at least one fluid inlet 167 that provides coolant (cooling fluid, fluid, etc.) to the motor cavity 154. The fluid inlet 167 may be fluidly connected to a plurality of first side inlets 168 and a plurality of second side inlets 169 (FIG. 1) of the motor 150. The cooling system 166 may also include at least one fluid outlet, which is schematically identified by arrow 170, through which the fluid may exit the motor cavity 154.

As shown, the first side inlets 168 may extend through the outer radial wall member 158. In some embodiments, the first side inlets 168 may extend radially along an axis that is substantially normal to the axis of rotation 120. The first side inlets 168 may extend through the outer radial wall member 158 and may be directed along their respective radial axes toward the first axial end 162 of the stator 146. The first side inlets 168 may be axially disposed along the axis 120 to be proximate a plurality of end windings 155 at the first axial end 162 of the stator 146. The end windings 155 are shown schematically in FIGS. 1 and 2.

In some embodiments, the first side inlets 168 may be formed by removing material (e.g. by cutting material) from the radial wall member 158. At least one of the first side inlets 168 may be a drilled hole formed via a drilling process.

There may be any suitable number of first side inlets 168. In some embodiments, there may a single first side inlet 168. In additional embodiments, there may be two or more. In some embodiments, there may be at least three first side inlets 168. As shown in the embodiments of FIG. 2, there may be a first, second, third, and fourth first side inlet 163*a*, 163*b*, 163*c*, 163*d*.

The second side inlets 169 may also extend through the outer radial wall member 158 and may be substantially similar to the first side inlets 168. However, the second side inlets 169 may be axially disposed along the axis 120 to be proximate the second axial end 164 of the stator 146. The second side inlets 169 may be proximate a plurality of second end windings 161 of the stator 146 (FIG. 1).

The fluid outlet 170 may extend through the outer radial wall member 158. The fluid outlet 170 may be axially disposed between the first side inlets 168 and the second side inlets 169. In some embodiments, the fluid outlet 170 may be axially disposed at a generally central location with respect to the first and second axial ends 162, 164 of the motor 150. The fluid outlet 170 may also extend along an axis that is substantially normal to the axis of rotation 120. The fluid outlet 170 may be a hole that is formed via a casting process, via a drilling process, or otherwise.

As shown in FIG. 2, at least some of the first side inlets 168 may be vertically disposed on a side of the axis 120 that is opposite the fluid outlet 170. As will be discussed, the second side inlets 169 may be similarly arranged. Thus, the outlet 170 may be disposed below those of the inlets 168, 169 with respect to a direction of gravity for gravity-assisted flow of the cooling fluid.

Figure 3:
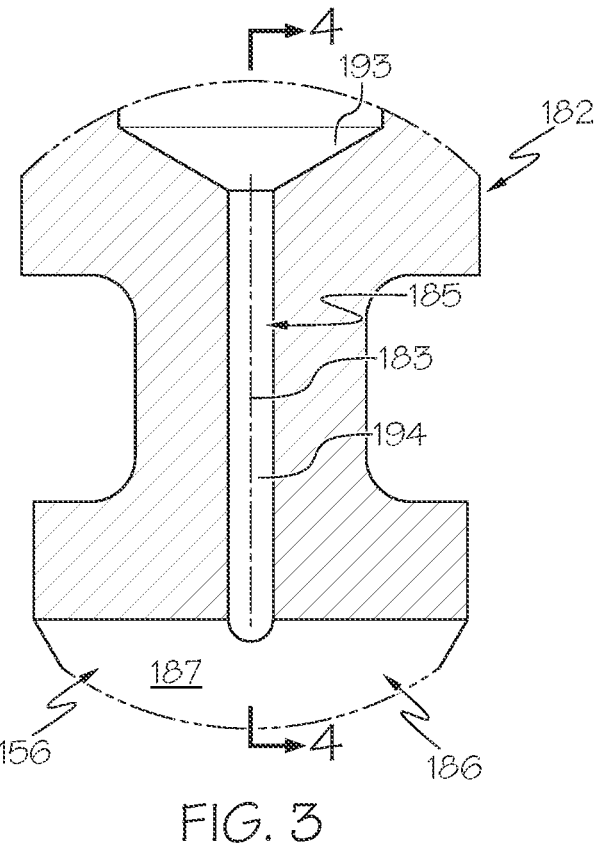
FIG. 3 is a detail view of a nozzle head of the e-machine of FIG. 2.
Figure 4:
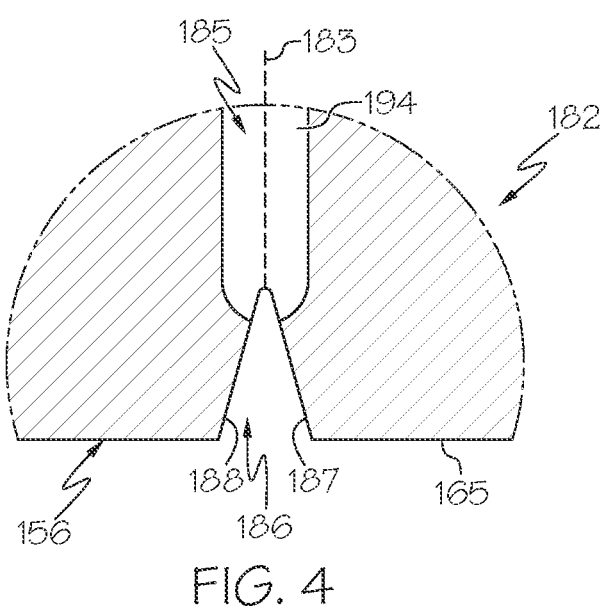
FIG. 4 is a cross-section of the nozzle head taken along the line 4-4 of FIG. 3.

Additionally, as shown in FIG. 2, the motor 150 may further include a plurality of nozzles 182 (i.e., nozzle members, sprayers, sprayer members, etc.). The first side inlets 168 may include respective ones of the plurality of nozzles 182. The nozzles 182 may be cylindrical, tubular and hollow so as to define a fluid passage 185 therethrough that terminates at a nozzle head 156. The nozzle head 156 may have a number of configurations without departing from the scope of the present disclosure. For example, in some embodiments represented in FIGS. 3 and 4, the nozzle head 156 may include a terminal end 165 with a wedge-shaped or triangular groove 186 thereon. The groove 186 may be defined by a first surface 187 and a second surface 188 that are disposed at an acute angle relative to each other. The first and second surfaces 187, 188 may be angled equally from a longitudinal axis 183 of the nozzle 182. The wedge- or triangular-shaped cross section of the groove 186 (FIG. 4) may be constant along one direction that is normal to the longitudinal axis 183. The fluid passage 185 may include a reservoir 193 within the nozzle 182, and the passage 185 may include an exit passage 194 that is disposed further downstream from the reservoir 193. The exit passage 194 may have a constant, circular, cross-sectional shape (taken normal to the longitudinal axis 183), and the exit passage 194 may extend through the nozzle head 156 and into the groove 186. Thus, the nozzle head 156 may provide a flat, fan-shaped spray profile 157 (FIG. 2) with a width that gradually increases as the spray profile 157 extends in a radially inward direction with respect to the axis of the rotation 120. In additional embodiments, the nozzle head 156 may be configured to provide a jet spray profile or another spray profile.

In some embodiments, the plurality of nozzles 182 of the first side inlets 168 may be arranged in an arrangement 184 about the axis of rotation 120 for spraying the cooling fluid generally toward the stator 146. The arrangement 184 may include a first group of the plurality of nozzles 182 (e.g., those of the first and fourth inlets 163*a*, 163*d*) disposed on a first side 191 of the axis of rotation 120 and a second group of the plurality of nozzles 182 (e.g., those of the second and third inlets 163*b*, 163) disposed on a second, opposite side 192 of the axis of rotation 120. The first side 191 may be disposed above the second side 192 with respect to a vertical axis 159 (i.e., the direction of gravity). The cooling fluid outlet 170 may be disposed on the second side 192 for gravity-assisted flow of the cooling fluid.

The plurality of nozzles 182 in the arrangement 184 may be spaced apart in a circumferential direction about the axis 120. In some embodiments, the nozzles 182 of the arrangement 184 may be spaced equally apart in the circumferential direction. For example, as shown in FIG. 2, the nozzles 182 may be spaced apart approximately ninety-degrees (90°) in the circumferential direction. Also, the nozzles 182 may be clocked at an angle (e.g., forty-five degrees (45°)) relative to the coordinate system defined by the axis of rotation 120 and the vertical axis 159.

The nozzles 182 may be removeably supported in the motor housing 152 with the grooves 186 extending tangentially with respect to an imaginary circle centered on the axis 120. As such, the fan spray profiles 157 of the nozzles 182 may be directed with its flat profile substantially normal to the axis 120 and with the width of the profile 157 gradually increasing as it extends inward toward the axis 120. As shown in FIG. 2, the spray profiles 157 of the first and fourth inlets 163a, 163d may be directed radially downward toward the axis of rotation 120, and the spray profiles 157 of the second and third inlets 163b, 163c may be directed radially upward toward the axis of rotation 120. A group of the nozzles 182 (e.g., those of the first and second inlets 163a, 163b) may be disposed horizontally on an opposite side of the axis 120 from another group of the nozzles 182 (e.g., those of the third and fourth inlets 163c, 163d).

In some embodiments, the nozzles 182 may be arranged such that the collective spray profile provided by the plurality of fan-shaped spray profiles 157 collectively span about and provide coverage about an imaginary circular boundary 171 (indicated at 171 in FIG. 2). The circular boundary 171 may be defined, for example, by the end windings 155 of the stator 146. In other words, the end windings 155 may be arranged so as to resemble a ring, annulus, etc., and the circular boundary 171 may have a diameter and location defined by that ring/annulus. The circular boundary 171 may also be referred to as an "end winding outer diameter boundary."

The nozzles 182 may be arranged with one or more of the fan spray profiles 157 providing coverage that spans at least ninety degrees of the circular boundary 171. The edges of the fan spray profile 157 of the plurality of nozzles 182 may extend tangentially with respect to the circular boundary 171 and may extend past the circular boundary 171 so as to overlap with an adjacent one of the fan spray profiles 157. Together, the spray profiles 157 of the nozzles 182 may collectively span about a majority of the circumference of the circular boundary 171. The spray provided by the nozzles 182 may, in some embodiments, cover an entirety of the circumference of the circular boundary 171.

Referring back to FIG. 1, the second side inlets 169 may be configured similar to the first side inlets 168. The second side inlets 169 may include respective ones of the nozzles 182 and may be disposed in a second arrangement 199 about the second end windings 161 of the stator 146. The second arrangement 199 may be substantially similar to the arrangement 184 of FIG. 2 and described above.

During operation, the cooling system 166 may be configured for delivering (e.g., spraying, projecting, etc.) a cooling fluid onto the axial ends 162, 164 of the stator 146. Cooling fluid (e.g., oil or other liquid coolant) may be delivered via the inlets 168, 169 to the nozzles 182 therein. The nozzles 182 may provide an atomized spray of cooling fluid to the end windings 155, 161 of the stator 146. The nozzles 182 may provide a spray that substantially covers and coats the end windings 155, 161. The cooling fluid may move from the stator 146 and flow toward the outlet 170, thereby convectively removing heat from the motor 150. Accordingly, the motor 150 may operate at high efficiency.

The electric motor 150 may be lightweight and compact. It may also have a relatively low part count. It will be appreciated that the electric motor 150 may be manufactured efficiently and at relatively low cost. The motor housing 152 may be manufactured, the inlets 168, 169 may be drilled therein, and the nozzles 182 may be inserted in the inlets 168, 169. The motor 150 may be provided in the motor housing 152 and the rest of the turbomachine 102 may be manufactured and assembled in a conventional manner. Accordingly, the cooling system 166 may be provided using efficient manufacturing techniques.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It is understood that various changes may be made in the function and arrangement of elements described in an exemplary embodiment without departing from the scope of the present disclosure as set forth in the appended claims.

What is claimed is:

1. An e-machine comprising:
   a housing;
   a rotating group supported for rotation about an axis of rotation within the housing;
   a stator disposed within the housing that is operably coupled to the rotating group, the stator including a plurality of end windings collectively defining an end winding outer diameter boundary;
   a plurality of nozzles removably supported by the housing and received within respective nozzle cavities, the nozzles arranged spaced apart in a circumferential direction about the axis of rotation, each nozzle further comprising a nozzle head having a wedge-shaped or triangular groove with first and second surfaces disposed at acute angles to each other for generating a fan-shaped spray profile of cooling fluid;
   at least one coolant outlet arranged lower, with respect to gravity, than the plurality of nozzles such that cooling fluid is gravity-assisted from the nozzles to the outlet; and
   wherein a plurality of fan-shaped spray profiles are directed generally radially inward with respect to the axis of rotation and collectively span a majority of, or the entirety of, the end winding outer diameter boundary,
   wherein edge portions of at least some fan-shaped spray profiles overlap with adjacent spray profiles to provide continuous coverage about the circumference of the end winding outer diameter boundary,
   and wherein the plurality of nozzles are removably supported such that each is received within a dedicated cavity of the housing.

2. The e-machine of claim 1, wherein the plurality of nozzles respectively defines a fan-shaped spray profile with a width that gradually increases as the fan-shaped spray profile extends in a radially inward direction with respect to the axis of rotation.

3. The e-machine of claim 2, wherein the plurality of end windings collectively defines an imaginary end winding outer diameter boundary that extends about the axis, and wherein the fan-shaped spray profiles of the plurality of nozzles are arranged to collectively span about a majority of the imaginary end winding outer diameter boundary.

4. The e-machine of claim 3, wherein the fan-shaped spray profiles of the plurality of nozzles are arranged to collectively span about an entirety of the imaginary end winding outer diameter boundary.

5. The e-machine of claim 3, wherein the fan-shaped spray profile of one of the plurality of nozzles overlaps with the fan-shaped spray profile of an adjacent one of the plurality of nozzles.

6. The e-machine of claim 2, wherein the plurality of end windings collectively defines an imaginary end winding outer diameter boundary that extends about the axis, and wherein the fan-shaped spray profile of at least one of the plurality of nozzles spans at least ninety degrees of the imaginary end winding outer boundary.

7. The e-machine of claim 1, wherein the plurality of nozzles includes at least three nozzles.

8. The e-machine of claim 7, wherein the plurality of nozzles includes at least four nozzles.

9. The e-machine of claim 8, wherein the plurality of nozzles includes a first nozzle, a second nozzle, a third nozzle, and a fourth nozzle; and wherein the housing includes a top side and a bottom side that are separated by a vertical axis, the first nozzle and the second nozzle extending through the top side and directed radially downward toward the axis of rotation, and the third nozzle and the fourth nozzle extending through the bottom side and directed radially upward toward the axis of rotation; and wherein the rotating group is supported by a bearing system selected from the group consisting of, a plain bearing, an air bearing on oil-less bearing.

10. The e-machine of claim 1, wherein ones of the plurality of nozzles are disposed at substantially equal distances in the circumferential direction.

11. The e-machine of claim 1, wherein the plurality of nozzles respectively defines a fan-shaped spray profile with a width that gradually increases as the fan-shaped spray profile extends in a radially inward direction with respect to the axis of rotation, and wherein the fan-shaped spray profile is disposed substantially normal relative to the axis of rotation.

12. An electric motor comprising:

a housing;

a rotating group supported for rotation about an axis of rotation within the housing;

a stator disposed within the housing that is operably coupled to the rotating group, the stator including a plurality of end windings, the plurality of end windings collectively defining an imaginary end winding outer boundary that extends continuously about the axis of rotation; and a plurality of nozzles removably supported by the housing within respective nozzle cavities, the nozzles and spaced apart in a circumferential direction about the axis of rotation, each nozzle comprising a nozzle groove with first and second surfaces disposed at acute angles to one another for generating a fan-shaped spray profile of cooling fluid; and at least one coolant outlet positioned lower, with respect to gravity, than the plurality of nozzles such that cooling fluid flows from the nozzles to the outlet under gravity assistance; and wherein the plurality of fan-shaped spray profiles are directed generally radially inward with respect the axis of rotation and collectively spun a majority of, or the entirety of, the imaginary end winding outer boundary; and wherein edge portions of at least some fan-s ed spray profiles overlap with adjacent spray profiles to provide continuous coverage about the circumference of the imaginary end winding outer boundary.

13. The electric motor of claim 12, wherein the spray profile covers an entirety of the imaginary end winding outer boundary in the circumferential direction about the axis of rotation.

14. The electric motor of claim 13, wherein at least one of the plurality of nozzles individually provides a fan-shaped spray profile that, with the others of the plurality of nozzles, defines the collective spray profile.

15. The electric motor of claim 14, wherein the fan-shaped spray profile of one of the plurality of nozzles overlaps with an adjacent spray profile of an adjacent one of the plurality of nozzles.

16. The electric motor of claim 14, wherein the fan-shaped spray profile of the at least one of the plurality of nozzles spans at least ninety degrees of the imaginary end winding outer boundary.

17. The electric machine of claim 12, wherein the plurality of nozzles includes a first nozzle, a second nozzle, a third nozzle, and a fourth nozzle; and wherein the housing includes a top side and a bottom side that are separated by a vertical axis, the first nozzle and the second nozzle extending through the top side and directed radially downward toward the axis of rotation, and the third nozzle and the fourth nozzle extending through the bottom side and directed radially upward toward the axis of rotation.

18. The electric motor of claim 12, wherein ones of the plurality of nozzles are disposed at substantially equal distances in the circumferential direction.

19. The electric motor of claim 12, wherein the plurality of nozzles respectively defines a fan-shaped spray profile with a width that gradually increases as the fan-shaped spray profile extends in a radially inward direction with respect to the axis of rotation, and wherein the fan-shaped spray profile is disposed substantially normal relative to the axis of rotation.

20. A method of manufacturing an e-machine comprising:

providing a housing;

supporting a rotating group for rotation about an axis of rotation within the housing;

inserting a stator within the housing, the stator including a plurality of end windings collectively defining an imaginary end winding outer boundary that extends continuously bout the axis of rotation; and removably supporting a plurality of nozzles in the housing so that each nozzle is received within a dedicated nozzle cavity and the nozzles are spaced apart in a circumferential direction about the axis of rotation;

providing a plurality of nozzles, each having a nozzle head with a groove comprising first and second surfaces disposed at acute angles, the groove being wedge-shaped or triangular in cross-section, configured to generate a fan-shaped pray profile, arranging, the plurality of nozzles such that fan-shaped spray profiles are directed generally radially inward and collectively span a majority of or an entirety of an imaginary end winding outer boundary, with edge portions of same fan-shaped spray profiles with edge portions of said fan-shaped spray profiles overlapping with those of adjacent nozzles to provide continuous coverage; and arranging at least one coolant outlet lower than the nozzles so that a cooling fluid flows from the nozzles to the outlet under gravity.

* * * * *